United States Patent
Yoshida et al.

(10) Patent No.: US 6,722,729 B2
(45) Date of Patent: Apr. 20, 2004

(54) AUTOMOBILE FRONT PILLAR (75) Inventors: Suguru Yoshida, Wako (JP); Hiroyuki Saegusa, Wako (JP); Munehiro Mouri, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,044

(22) PCT Filed: May 31, 1999

(86) PCT No.: PCT/JP99/02875

§ 371 (c)(1),
(2), (4) Date: Dec. 30, 1999

(87) PCT Pub. No.: WO99/62755

PCT Pub. Date: Dec. 9, 1999

(65) Prior Publication Data
US 2002/0057003 A1 May 16, 2002

(30) Foreign Application Priority Data

Jun. 4, 1998 (JP) .......................................... 10-155699

(51) Int. Cl.⁷ .............................................. B62D 25/04
(52) U.S. Cl. ............................ 296/187.09; 296/203.02; 296/205
(58) Field of Search .............................. 296/189, 190.1, 296/203.01, 203.03, 205, 209, 210, 187.09, 187.03

(56) References Cited

U.S. PATENT DOCUMENTS

| 3,292,969 A | * | 12/1966 | Eggert, Jr. |
| 3,596,979 A | * | 8/1971 | Hablitzel et al. |
| 5,096,254 A | * | 3/1992 | Sparke |
| 5,163,730 A | | 11/1992 | Welch |
| 5,213,391 A | * | 5/1993 | Takagi |
| 5,269,585 A | * | 12/1993 | Klages et al. |
| 5,564,744 A | * | 10/1996 | Frost |
| 5,575,500 A | * | 11/1996 | Mimura et al. |
| 5,836,641 A | * | 11/1998 | Sugamoto et al. |
| 5,988,733 A | * | 11/1999 | Kamo et al. |
| 6,042,176 A | * | 3/2000 | Ikeda et al. |

FOREIGN PATENT DOCUMENTS

| DE | 40 16 730 A1 | * | 11/1991 |
| JP | 9-39833 | | 2/1997 |

* cited by examiner

Primary Examiner—Joseph D. Pape
(74) Attorney, Agent, or Firm—Merchant & Gould P.C.

(57) ABSTRACT

An automobile front pillar (1; 40; 50) includes, at a portion thereof positioned closely to a passenger compartment (16) of an automobile (10), a weak portion (27b; 47b; 62) for initiating the buckling of the front pillar upon application of a shock to that part of the front pillar positioned remotely from the compartment. When an obstacle collides with the front pillar portion positioned remotely from the compartment, the weak portion collapses by the resulting collision shock to cause the front pillar to buckle. The collision shock is partly absorbed by the buckling front pillar, whereby the shock applied to the obstacle is significantly damped.

5 Claims, 8 Drawing Sheets

AUTOMOBILE FRONT PILLAR

TECHNICAL FIELD

The present invention relates to an improvement in an automobile front pillar with shock absorbing capability.

BACKGROUND ART

Figure 8:
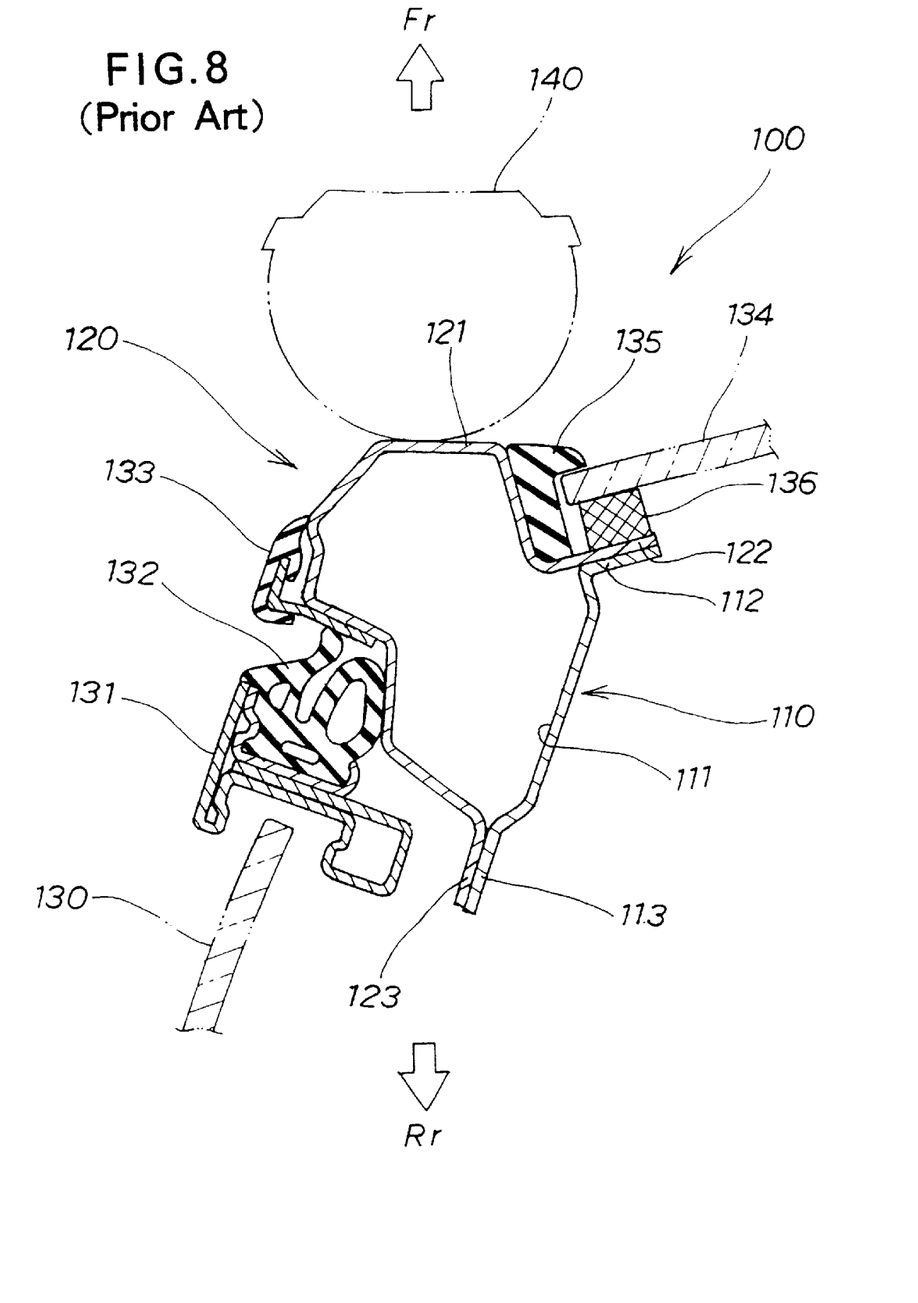
FIG. 8 is a cross-sectional view illustrating the arrangement of a typical example of conventional front pillars.

An example of conventional automobile front pillars is illustrated in enlarged cross-section in FIG. 8 hereof. In the figure, reference characters Fr and Rr respectively represent front and rear directions of the automobile.

Front pillar 100 is composed of an inner frame 110 and an outer frame 120 joined with the inner frame 110 to provide a tubular configuration.

Inner frame 110 is formed of a sheet metal folded to provide a dish-shaped cross section and has a concave bottom portion 111. At opposite ends, the bottom portion 111 has joining portions 112, 113 in the form of flanges for joining with the outer frame 120.

Outer frame 120 is formed from a sheet metal folded to provide a generally U-shaped cross section and has a front portion 121 forming a convex part of the U shape. At opposite open ends, the outer frame 120 has joining portions 122, 123 in the form of flanges for joining with the companion joining portions 112, 113 of the inner frame 110.

Front pillar 100 has a tubular cross section provided by joining the joining portion 112 of the inner frame 110 with the joining portion 122 of the outer frame 120 and the joining portion 113 of the inner frame 110 with the joining portion 123 of the outer frame 120. The front pillar 100 forms part of the skeleton of an automobile side body.

Door weather strip 132 is provided on a door sash 131, carrying a door glass sheet 130, for achieving seal between the door sash 131 and the front pillar 100. A molding 133 is attached to the outer frame 120 of the front pillar 100. A separate sealing weather strip 135 and sealant 136 are disposed between the outer frame 120 and a windshield 134. An obstacle 140 is shown forwardly of the front pillar 100 by a two-dot-and-dash line.

Front pillar 100 has high rigidity because it forms part of the automobile side body as mentioned above. Due to the high rigidity of the front pillar 100, the obstacle 140 is imparted with a large shock or impact upon collision against the front portion 121 of the outer frame 120. Thus, where priority should be given to the protection of the obstacle 140, it becomes necessary to decrease the rigidity of the front pillar 100. However, decreasing the rigidity of the front pillar 100 results in an automobile body with decreased rigidity, which may therefore be easily deformed upon turnover of the body. Consequently, there has been a demand for an automobile front pillar which retains its initially required rigidity but can sufficiently buffer a collision shock to the obstacle.

An example automobile front pillar in which arrangements are made for damping a collision shock to an obstacle is disclosed in Japanese Patent Laid-Open Publication No. HEI9-39833 entitled "AUTOMOBILE FRONT PILLAR". The disclosed automobile front pillar includes a shock damping panel provided at a front part of an outer frame forming part of a pillar body.

However, the front pillar is obtained by the mere addition of the shock damping panel to a conventional front pillar. Consequently, when the obstacle collides against the pillar body through the shock damping panel, shock energy arising from the collision is damped by only the deformed shock damping panel. There is no means left for absorbing shock energy arising after the collision reaches the pillar body. Hence, sufficient damping of the shock to the obstacle cannot be achieved in the disclosed front pillar structure. To sum up, the pillar body of the disclosed front pillar structure has rigidity as inherently required therein but no arrangements are provided in the pillar body for damping the collision shock, arising after collision of the obstacle against the pillar body, to the obstacle.

DISCLOSURE OF THE INVENTION

It is therefore an object of the present invention to provide an automobile front pillar which has rigidity as inherently required therein and can sufficiently damp a shock, arising from the collision of an obstacle with the front pillar, from the obstacle.

According to the present invention, there is provided an automobile front pillar which includes, at a portion thereof positioned closely to a passenger compartment of an automobile, a weak portion for initiating the buckling of the front pillar upon application of a shock to that part of the front pillar positioned remotely from the compartment. In this arrangement, when an obstacle collides with the front pillar portion positioned remotely from the compartment, the weak portion collapses by the resulting collision shock to cause the front pillar to buckle. The collision shock is partly absorbed by the buckling front pillar. As a result, the shock applied to the obstacle is significantly damped. The weak portion is desirably covered by a cover so that it may not be exposed to view from the passenger compartment.

Preferably, the front pillar portion positioned remotely from the passenger compartment includes at its front part a flat portion having a protecting member with shock absorbing capability. The protecting member absorbs an initial part of the collision shock before the front pillar buckling begins, thereby effectively damping the shock applied to the obstacle. In addition, a shock damping member forte absorbing part of the shock may be provided within the front pillar so as to minimize the shock to the obstacle.

In a desired form, the front pillar comprises an inner frame positioned closely to the passenger compartment and an outer frame joined with the inner frame and having a portion positioned remotely from the passenger compartment. The weak portion may be provided in the inner frame. Alternatively, the weak portion may be provided in that part of the outer frame positioned closely to the passenger compartment.

It is preferred that the inner frame includes a reinforcing member attached thereto so that the front pillar can maintain its inherent rigidity. In a preferred form, the reinforcing member comprises a reinforcing pipe and a reinforcing plate attached to the inner frame.

BRIEF DESCRIPTION OF THE DRAWINGS

Certain preferred embodiments of the present invention will hereinafter be described in detail, by way of example only, with reference to the accompanying drawings, in which.

BEST MODE FOR CARRYING OUT THE INVENTION

Figure 1:
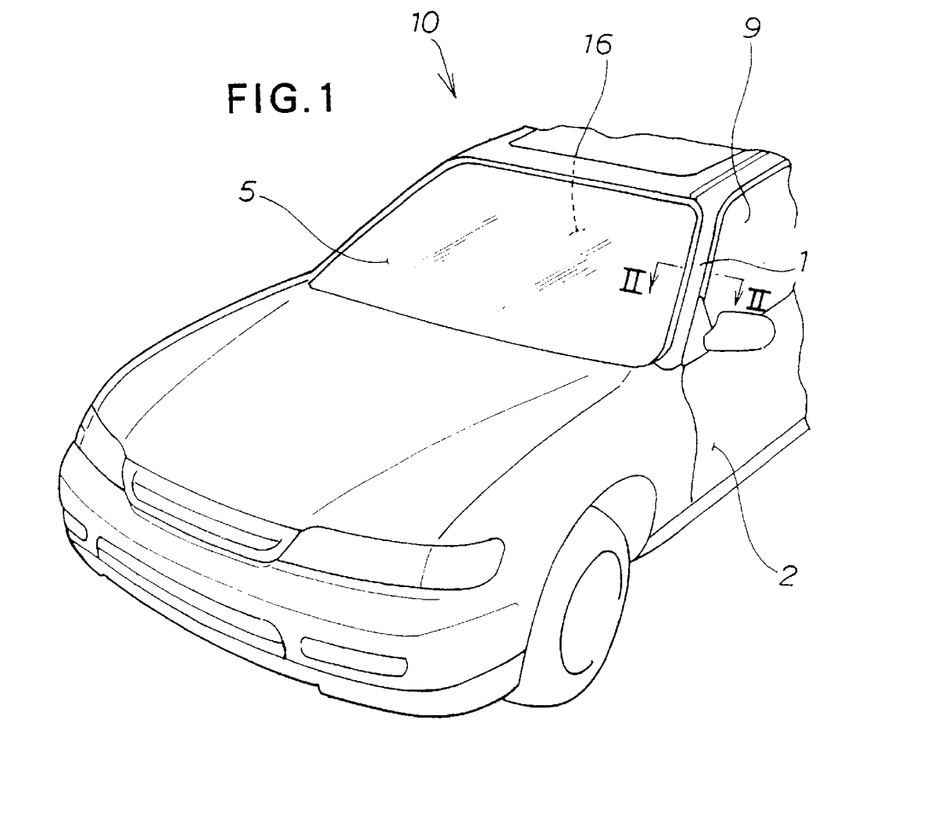
FIG. 1 is a perspective view illustrating a front part of an automobile employing a front pillar according to the present invention.

In FIG. 1, there is shown a front part of an automobile 10 employing a front pillar 1 according to the present invention. The automobile comprises a door 2, a windshield 5, a door glass 9 and a passenger compartment 16.

Figure 2:
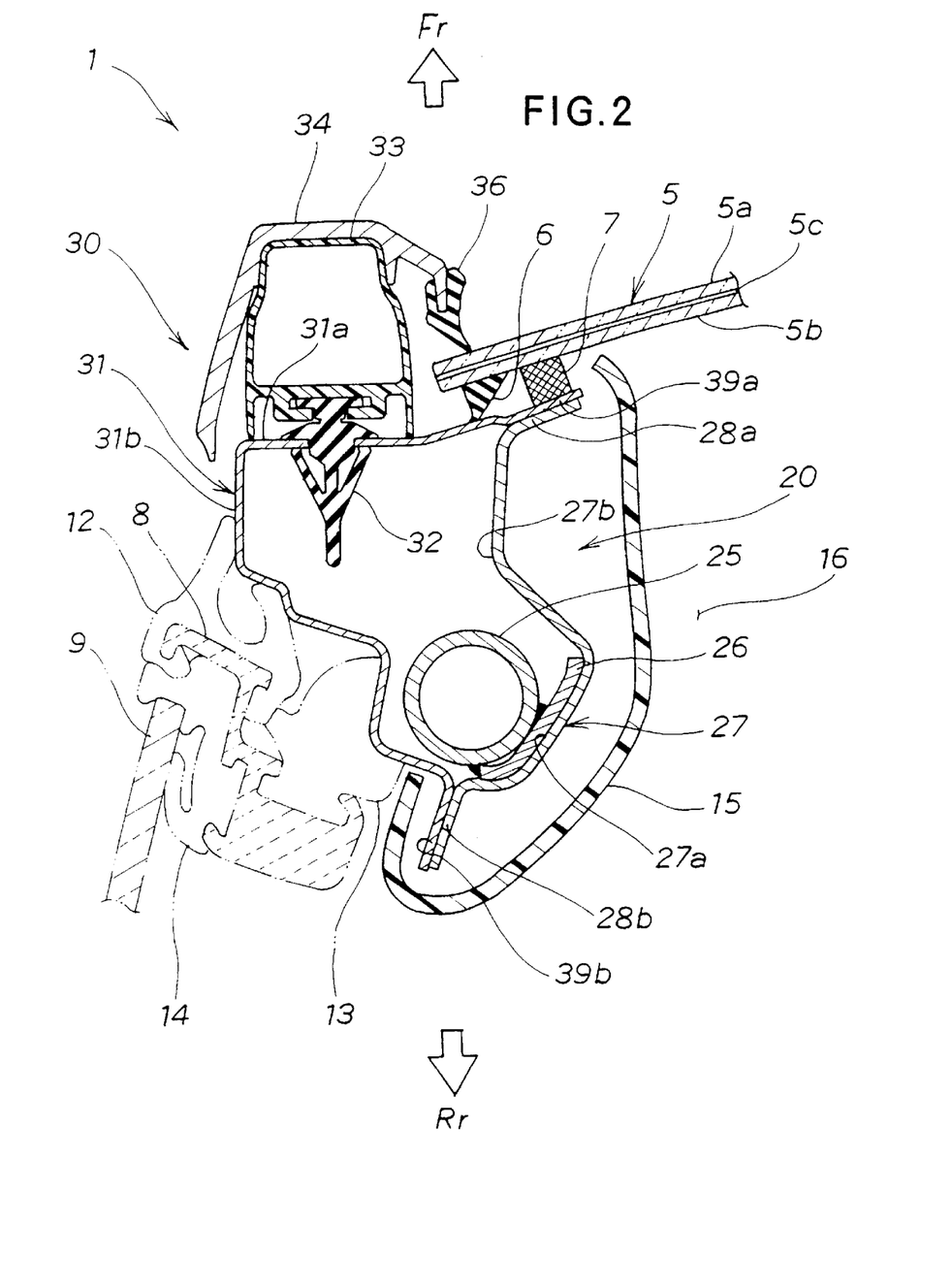
FIG. 2 is a cross-sectional view taken along line II—II of FIG. 1, showing the front pillar according to a first embodiment of the present invention.
Figure 3:
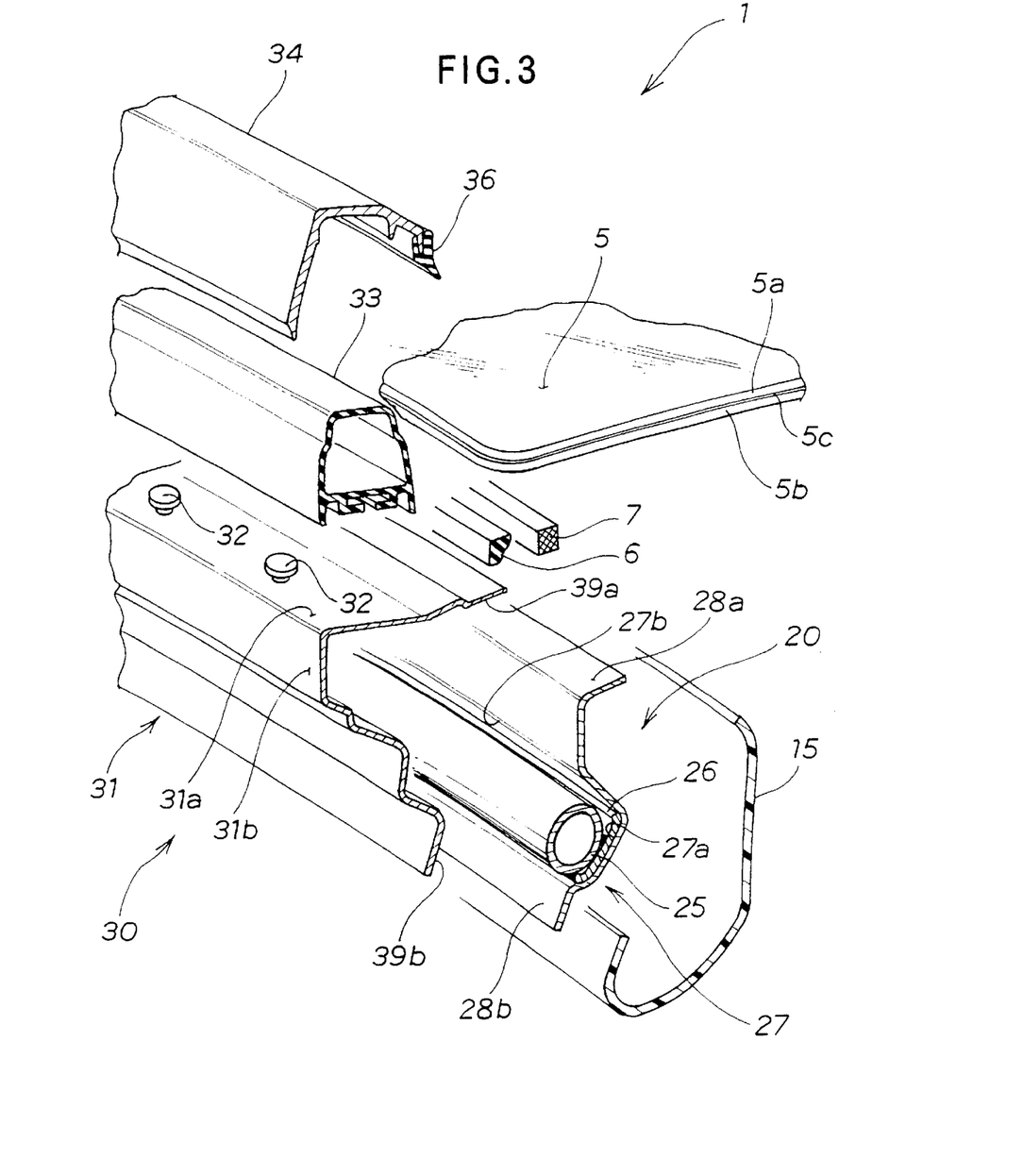
FIG. 3 is a perspective view illustrating the front pillar of FIG. 2.

Reference is made next to FIG. 2 showing in enlarged cross section the front pillar 1 according to a first embodiment of the present invention, as well as to FIG. 3 showing the front pillar in perspective. Arrows Fr and Rr in FIG. 2 respectively indicate front and rear directions with respect to the automobile.

Front pillar 1 includes an inner frame 20 and an outer frame 30. The inner and outer frames 20, 30 are joined together to provide the front pillar 1 of tubular cross section.

Between the outer frame 30 and the windshield 5, a sealing weather strip 6 and sealant 7 are provided. For achieving seal between a door sash 8 carrying the door glass 9 and the outer frame 30, an outside weather strip 12 and an inner weather strip 13 are provided on the door sash 8. For achieving seal between the door glass 9 and the door sash 8, a window weather strip 14 is provided on the door sash 8. The inner frame 20 is enclosed by a cover 15 made from a synthetic resin so that no part of the front pillar 1 is exposed to view from the passenger compartment 16. The cover 15 not only serves as an ornamental member for improving the appearance of the passenger compartment 16 but also performs the function of providing protection with respect to the front pillar 1.

Windshield 5 comprises a laminated glass sheet obtained by adhesively joining together two glass sheets 5a, 5b via a transparent film 5c of resin, such as polyvinyl butyral.

Inner frame 20 includes a reinforcing pipe 25 and a frame portion 27. A reinforcing plate 26 welded or adhesively connected to the reinforcing pipe 25 is attached to the frame portion 27. The reinforcing pipe 25 functions as a core member of the inner frame 20. The reinforcing plate 26 adds up rigidity to a base portion 27a of the frame portion 27. Being thus reinforced by the reinforcing pipe 25 and the reinforcing plate 26, the front pillar 1 will not be deformed longitudinally thereof upon turnover of the automobile. The inner frame 20 is positioned internally of the passenger compartment 16.

Frame portion 27 is formed of a sheet metal folded to provide a generally U-shaped cross section and has on one end a joining portion 28a in the form of a flange for joining with the outer frame 30 and on the other end a joining portion 28b in the form of a flange for joining with the outer frame 30. Between the base portion 27a and the joining portion 28a, the frame portion 27 also has a bent or angled portion 27b as a weak portion formed such that it projects radially inwardly of the front pillar 1. When an impact or collision energy is applied to the outer frame 30, the inner frame 20 bends about the angled portion 27b such that the angled portion 27b is projected deep into the inside of the front pillar 1. The bent or weak portion 27b thus serves to initiate the buckling of the front pillar 1 upon application of the collision energy to the pillar 1.

Outer frame 30 comprises a frame body 31, a protecting member 33 attached to the frame body 31 via support snaps 32 (see FIG. 3), an ornamental frame 34 attached to a frontal side of the protecting member 33, and a molding 36 attached to one end of the ornamental frame 34.

Frame body 31 includes a flat portion 31a extending outwardly from a joining portion 39a in the form of a flange for joining to the joining portion 28a of the frame portion 27, an outer wall portion 31b extending rearwardly from the flat portion 31a, and a joining portion 39b in the form of a flange for joining to the joining portion 28b of the frame portion 27. The protecting member 33 is attached to the flat portion 31a via the support snaps 32.

Protecting member 33 is extrusion molded from a resin, such as vinyl chloride, which can be easily deformed by an impact from forward to thereby absorb the impact.

Ornamental frame 34 improves the appearance of the front pillar 1 and is formed from a material deformable by an impact from the front.

Discussion will be made next as to an operation of the thus-arranged front pillar 1 according to the first embodiment of the present invention, with reference to FIGS. 4A, 4B, 5A and 5B.

Figure 4A:
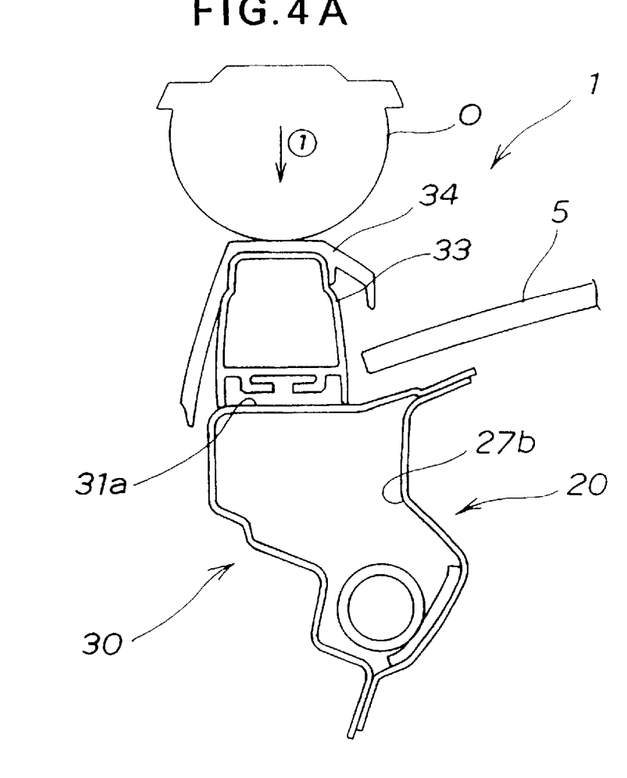
FIGS. 4A, 4B, 5A and 5B are schematic views illustrating how the front pillar according to the first embodiment is deformed by a colliding obstacle.
Figure 4B:
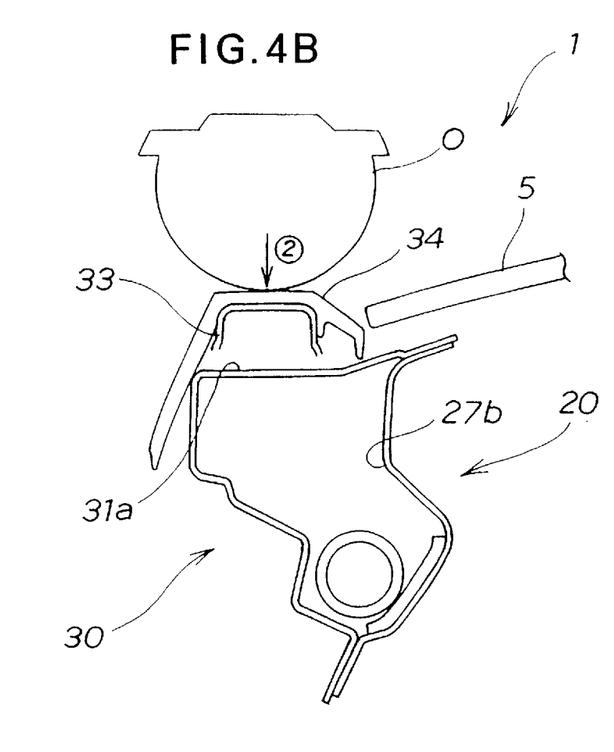

When an obstacle O collides with the front pillar 1 as shown by arrow ① in FIG. 4A, the protecting member 33 collapses as a result of the impact applied thereto through the ornamental frame 34 as shown by arrow ② in FIG. 4B. The protecting member 33 thus absorbs an initial part of the collision energy of the obstacle O and thereby effectively mitigates the shock to the obstacle O. The ornamental frame 34 is formed from a material deformable by a shock coming from the front and hence does not present a bar to the protecting member 33.

Figure 5A:
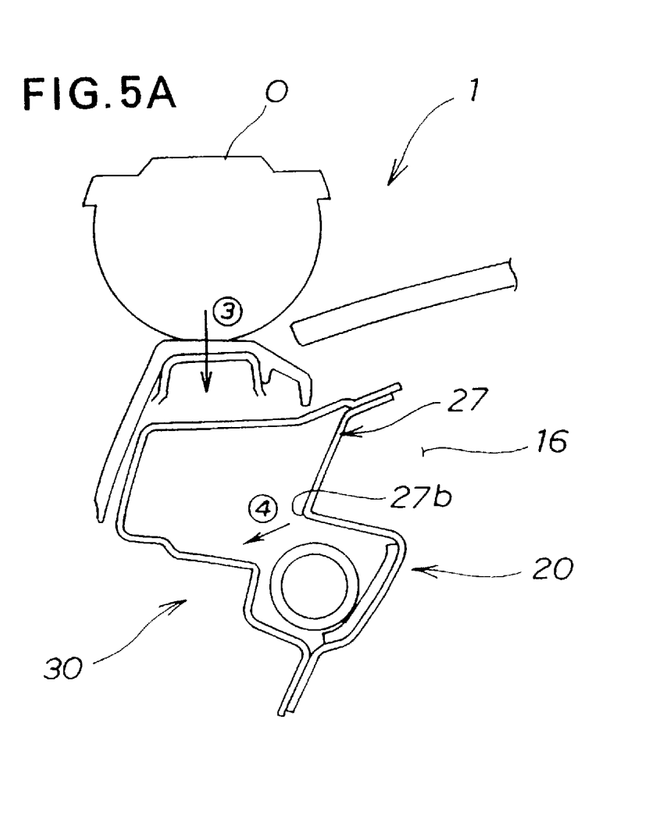

Continuously, as the impact of the obstacle O reaches deep into the front pillar 1 as shown by arrow ③ in FIG. 5A, the impact is transmitted through the outer frame 30 to the inner frame 20. As a result, the inner frame 20 deforms such that the angled portion 27b of the frame portion 27 is projected or pushed inwardly of the front pillar 1, as shown by arrow ④. Since the inner frame 20 thus deforms or buckles rearwardly together with the outer frame 30, the collision energy is absorbed through buckling, whereby the shock to the obstacle O is mitigated.

Figure 5B:
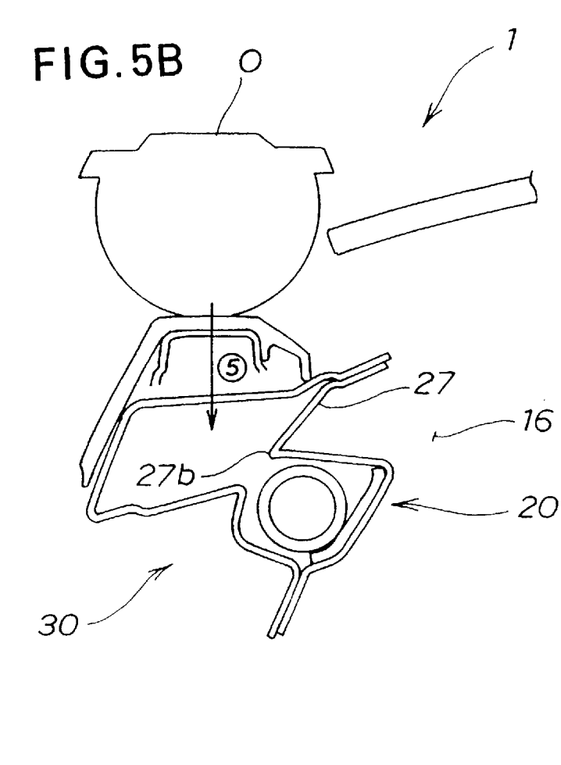

Illustrated in FIG. 5B is a final state in which the impact of the obstacle O has reached the front pillar 1, as indicated by arrow ⑤. The bent portion 27b of the frame portion 27 is collapsed fully so that the impact or shock to the obstacle O is sufficiently mitigated as a result of its absorption during collapsing or buckling of the inner frame and outer frame 20, 30.

Although the bent portion 27b for initiating or facilitating the buckling of the front pillar 1 is provided on that side of the pillar proximate to the compartment 16, it does not harm the appearance of the compartment interior because the bent portion 27b is enclosed by the cover 15 (see FIG. 1).

Figure 6:
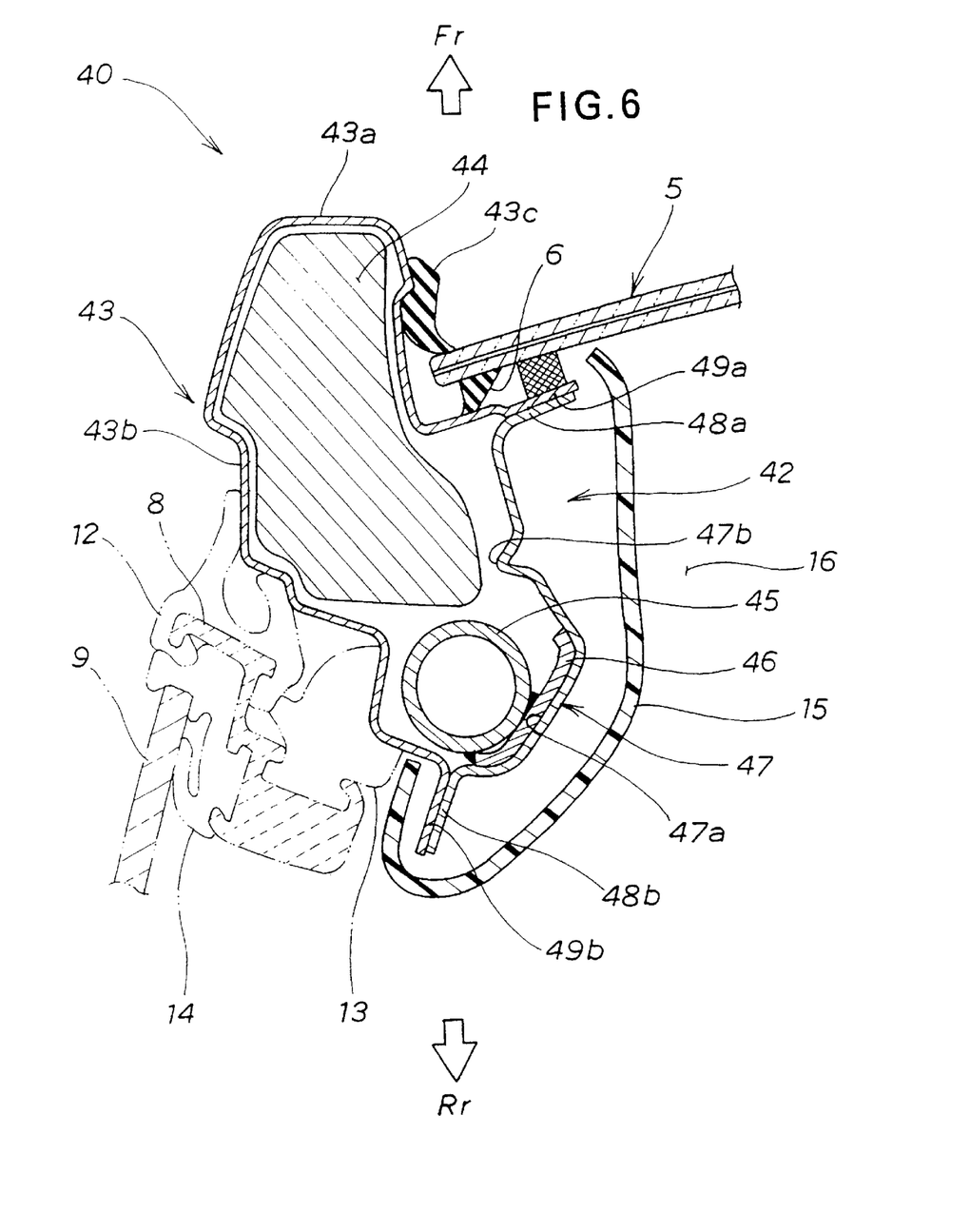
FIG. 6 is a cross-sectional view taken transversely of the front pillar according to a second embodiment of the present invention.

Discussion will be made next as to a front pillar 40 according to a second embodiment of the present invention with reference to FIG. 6.

Front pillar 40 comprises an inner frame 42, an outer frame 43, and a shock damping member 44 disposed between the inner and outer frames 42, 43 for absorbing a shock or impact of a colliding obstacle.

Inner frame 42 includes a reinforcing pipe 45 serving as a frame core member as in the first embodiment, and a frame portion 47. The reinforcing pipe 45 is attached to a base portion 47a of the frame portion 47 via a reinforcing plate 46.

Frame portion 47 is formed from a sheet metal folded to provide a generally U-shaped cross section and has at one end thereof joining portion 48a in the form of a flange for joining with the outer frame 43 and at an opposite end thereof a joining portion 48b in the form of a flange for joining with the outer frame 43. Between the base portion 47a and the joining portion 48a, the frame portion 47 also includes a V-shaped portion 47b for serving as a weak or collapsible portion.

Although the V-shaped portion 47b for initiating or promoting of the inner frame 42 is provided on that side of the front pillar 40 which is close to the passenger compartment, it does not harm the appearance of the compartment interior because the V-shaped portion 47b is covered by the cover 15 so that it may not be exposed to view from the compartment.

Outer frame 43 comprises a joining portion 49a in the form of a flange provided at one end thereof for joining with the joining portion 48a of the frame portion 47 of the inner frame 42, a bulged portion 43a projecting forwardly from the joining portion 49a, an outer wall portion 43b extending rearwardly from the bulged portion 43a, and a joining portion 49b in the form of a flange, provided at a distal end of the outer wall portion 43b, for joining with the joining portion 48b of the frame portion 47. Reference numeral 43c designates a molding attached to the bulged portion 43a.

When the collision shock of the obstacle O (see FIGS. 5A and 5B) reaches as deep as the high rigidity portions of the front pillar 40, namely, the reinforcing pipe and plate 45 46, the shock damping member 44 minimizes the impact which is imparted through the high rigidity portions of the front pillar 40 to the obstacle O.

Figure 7:
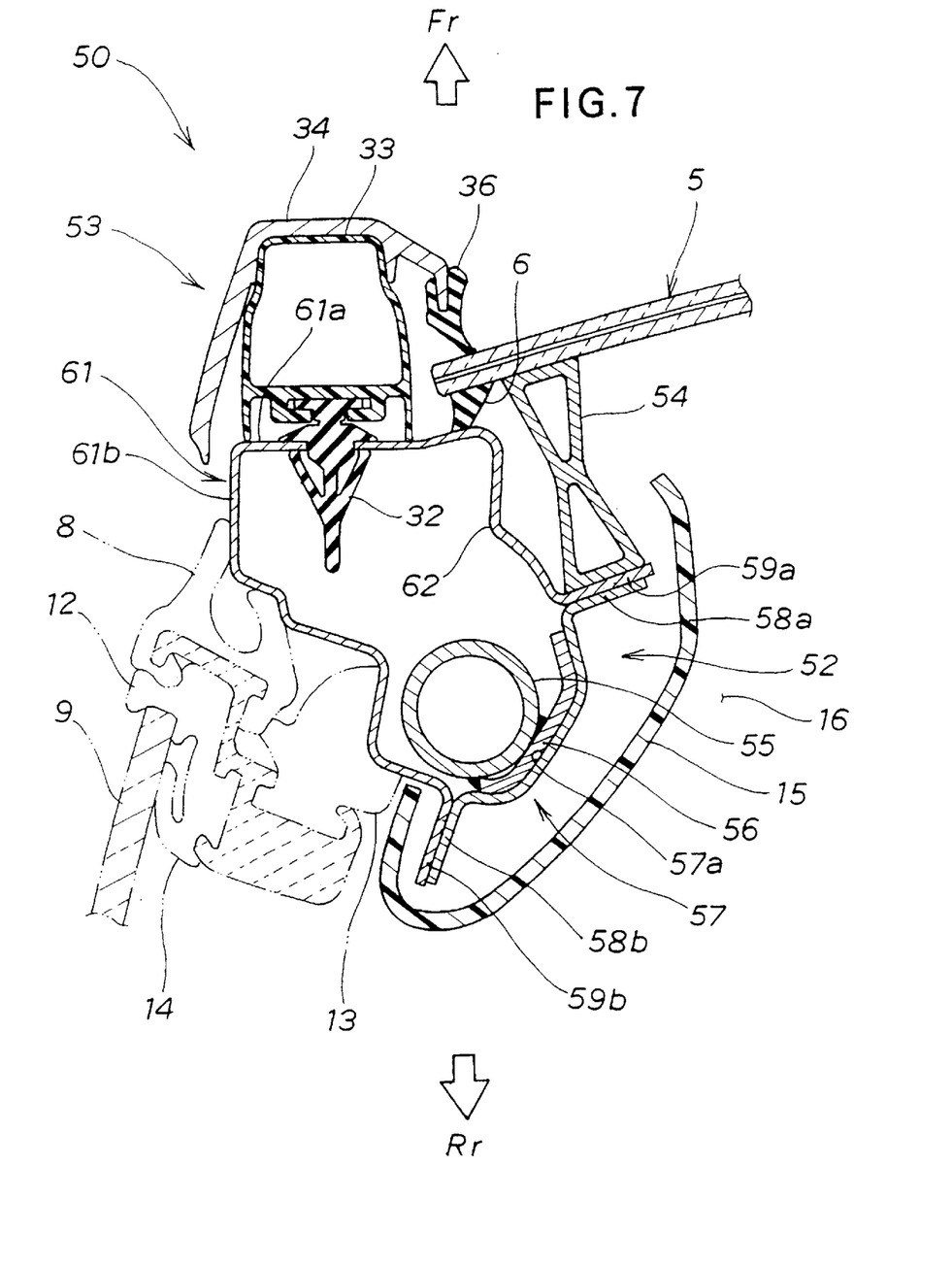
FIG. 7 is a cross-sectional view taken transversely of the front pillar according to a third embodiment of the present invention.

As shown in FIG. 7, a front pillar 50 according to a third embodiment of the present invention comprises an inner frame 52 and an outer frame 53. A flexible spacer 54 with shock absorbing capability is disposed between the windshield 5 and the front pillar 50. The spacer 54 deforms when one end of the obstacle collides with the windshield 5 and thereby minimizes the collision chock imparted from the windshield 5 to the obstacle.

Inner frame 52 comprises a frame portion 57 and a reinforcing pipe 55 serving as a core member for the frame portion 57. The reinforcing pipe 55 is attached to the frame portion 57 through a reinforcing plate 56. Both the reinforcing pipe 55 and reinforcing plate 56 function in the same manner as those of the first embodiment described in relation to FIG. 2. The frame portion 57 is formed from a sheet metal folded to provide a generally U-shaped cross section and has a base portion 57a positioned centrally thereof, a joining portion 58a in the form of a flange provided at one end thereof for joining with the outer frame 53, and a joining portion 58b in the form of a flange provided at an opposite end thereof for joining with the outer frame 53.

Outer frame 53 comprises a frame body 61, a protecting member 33 attached to the frame body 61 through support snaps 32 (see FIG. 3), an ornamental frame 34 attached to a front side of the protecting member 33, and a molding 36 attached to one end of the ornamental frame 34.

Frame body 61 includes a joining portion 59a in the form of a flange for joining with the joining portion 58a of the frame portion 57 of the inner frame 52, a flat portion 61a extending outwardly from the joining portion 59a past a bent or angled portion 62 for serving as a weak portion, an outer wall portion 61b extending rearwardly from the flat portion 61a, and a joining portion 59b in the form of a flange provided at a distal end of the outer wall portion 61b for joining with the joining portion 58b of the frame portion 57 of the inner frame 52. The bent portion 62 is provided in the outer frame 61, not in the inner frame as in the first and second embodiments. The bent portion 61 is positioned in that part of the outer frame 61 which is close to the passenger compartment 16.

With the bent portion 62 serving as a weak portion for initiating or facilitating the buckling of the outer frame 61, which is provided in that part of the outer frame 61 located proximately to the passenger compartment 16, the bent portion 62 collapses or buckles upon collision of the obstacle against the front pillar 50 such that the bent portion 62 is projected radially inwardly, that is, into the internal space, of the front pillar 50 and thereby absorbs the collision impact. The bent portion 62 is covered by the cover 15 so that it is not exposed to view from the passenger compartment 16.

As can be readily appreciated by those skilled in the art, the bent or weak portions 27b (FIG. 2), 62 (FIG. 7) and V-shaped portion 47b (FIG. 6) according to the first, second and third embodiments can be apertured so that the buckling of the front pillar is further facilitated.

Obviously, various minor changes and modifications of the present invention are possible in the light of the above teaching. It is therefore to be understood that within the scope of the appended claims, the present invention can be practiced otherwise than as specifically described.

What is claimed is:

1. A front pillar for an automobile having a passenger compartment, comprising:

a structure being a tube in cross-section with a first portion positioned closely to the passenger compartment and a second portion positioned remotely from the passenger compartment; and a reinforcing pipe connected to said first portion of said structure;

said structure further having a weak portion positioned relative to said reinforcing pipe on a side of said reinforcing pipe facing away from the passenger compartment, said weak portion including a first angled portion in said first portion projecting inwardly of said first portion and a second angled portion in said second portion projecting inwardly of said second portion;

wherein a force from outside said automobile impacting said front pillar at said second portion positioned remotely from the passenger compartment causes said structure to buckle at said weak portion and absorb energy before said force impacts said reinforcing pipe.

2. The front pillar according to claim 1, wherein said second portion positioned remotely from the passenger compartment includes at a front part thereof a flat portion having a protecting member capable of absorbing a shock.

3. The front pillar according to claim 1, further including a shock damping member provided internally of said structure for absorbing a shock.

4. The front pillar according to claim 1, further including a flexible spacer provided between said structure and a windshield for absorbing a shock to the windshield.

5. The front pillar according to claim 1, wherein a reinforcing plate is attached between said first portion of said structure and said reinforcing pipe.

* * * * *